Jan. 30, 1968     H. ASHER     3,365,914

ROTARY COUPLING

Filed March 3, 1966     2 Sheets-Sheet 1

—FIG.1.—

INVENTOR:
HARRY ASHER.
BY
ATTORNEY 3,365,914
ROTARY COUPLING
Harry Asher, Thorntonville, Cleckheaton, England, assignor to Holset Engineering Company Limited, Huddersfield, England, a British company
Filed Mar. 3, 1966, Ser. No. 531,490
Claims priority, application Great Britain, Mar. 17, 1965, 11,237/65
5 Claims. (Cl. 64—23)

ABSTRACT OF THE DISCLOSURE

A rotary coupling for transmitting torque between two coaxial shafts with simultaneous allowance for axial movements between them, having an outer member, and an inner member positioned coaxially spaced within the outer member, the two members rotatable about their axes, with a plurality of coupling elements mounted tiltably between them for their frictional engagement.

Cross references to related applications

Priority of corresponding patent application filed in Great Britain, Mar. 17, 1965, No. 11,237/65 is claimed under the Convention.

Background of the invention.—Field of the invention

This invention relates to rotary couplings for coupling together shafts or similar rotatable members for the transmission of torque therebetween, and in particular to couplings which also permit axial movement of one rotatable member relative to the other.

A rotary coupling may be formed between two shafts of similar diameter by forming splines at one end of each shaft and fitting these two splined ends into opposed ends of an axial through bore in a cylindrical coupling member, the internal face of which is provided with complementary splines to engage the splines on the ends of the two shafts.

Alternatively if the two shafts are of substantially differing diameter, one end of the larger shaft may be provided with an internally splined axial bore to receive an externally splined end of the smaller shaft.

In order to reduce noise and wear to a minimum the splines have to be very accurately formed. However, the formation of internal splines is expensive, and the present invention therefore seeks to provide a rotary coupling for transmitting torque between two coaxial shafts or similar rotatable members while allowing relative axial movement therebetween, which does not require internal splines.

Summary of the invention

According to the present invention a rotary coupling for transmitting torque between two coaxial shafts or the like while allowing relative axial movement therebetween comprises an outer member, an inner member arranged coaxially within but radially separated from the outer member by a plurality of coupling elements which tilt and frictionally engage the two members to prevent relative rotary displacement thereof but rotate freely to permit relative axial movement therebetween.

Preferably the coupling elements are barrel-shaped rollers and are arranged and located in at least one ring with the axes of symmetry of the rollers in the ring all lying in the same plane. Also it is preferable that the roller major diameters are such as to present a degree of interference, or preload, across the intervening space between inner and outer members.

Conveniently the outer surface of the inner member is formed with a plurality of axially parallel longitudinal concave grooves for receiving the barrel-shaped rollers, each groove being concave and having a radius of curvature commensurate with the radius of the bore.

According to a preferred feature of the invention, the radius of curvature of the synclastic surface of each roller in an axial plane thereof, is substantially commensurate with the radius of curvature of the bore.

The coupling elements are conveniently located in the coupling by means of a cage.

Brief description of the drawings

The invention will be described further by way of example with reference to the accompanying drawings, in which.

Description of the preferred embodiments

Figure 1:
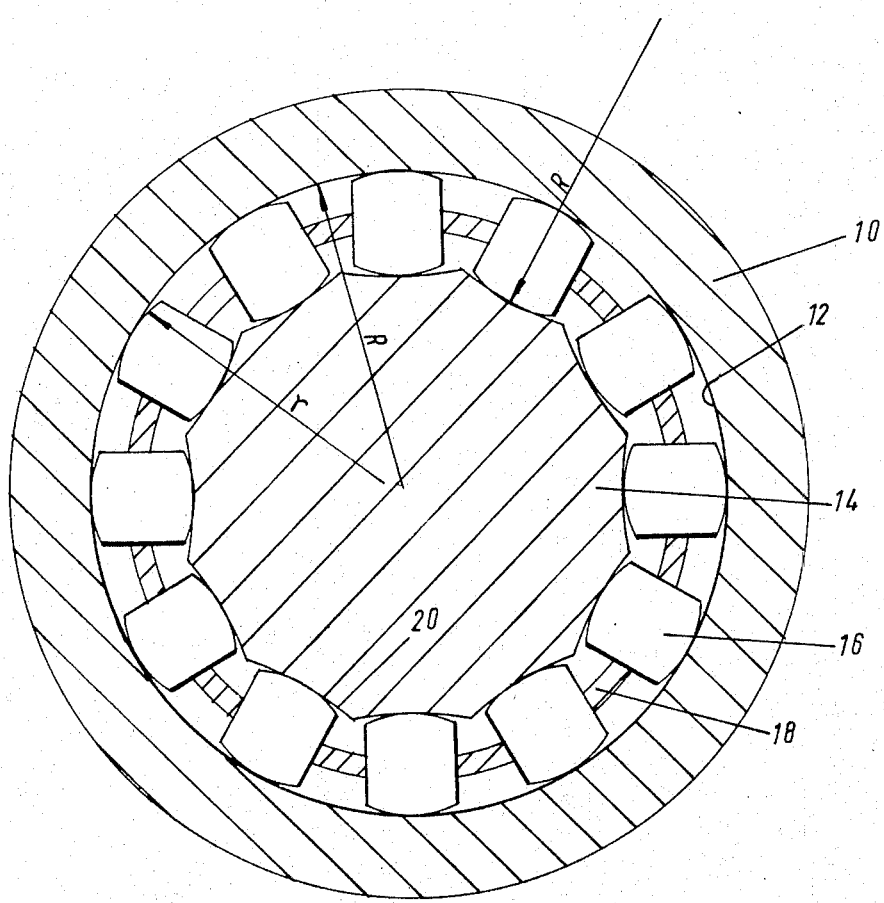
FIG. 1 is a radial section of one shaft coupling embodying the invention.
Figure 2:
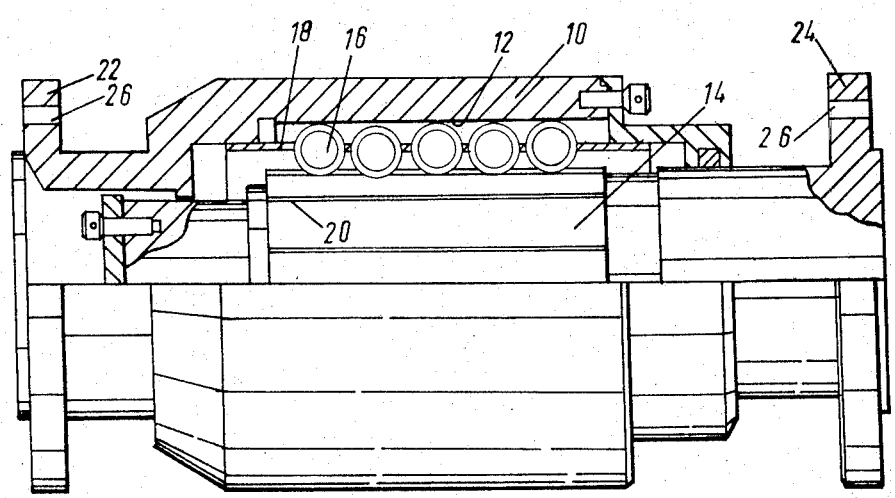
FIG. 2 is a side view of the same embodiment partly sectioned on an axial plane.

The coupling illustrated in the drawings comprises an outer cylindrical member 10 having an internal cylindrical bore 12 of diameter 2R, an inner cylindrical member 14 which is supported within the bore 12 and several rings of barrel-shaped rollers 16 disposed around the inner member 14 in the space between the inner and outer member, and located in position by a cage 18.

Furthermore the outer surface of the inner member 14 is formed with a plurality of axially extending grooves 20, each groove having a radius of curvature R, and the radius of curvature $r$ of the barrel-shaped rollers taken in their axial plane is fractionally less than the radius of curvature R of its two bounding surfaces. In the preferred embodiment illustrated in the drawings, $$\frac{R}{r} = 1.02$$

that is the radius of curvature of the bounding surfaces R is 2% greater than the major radius of curvature $r$ of the synclastic surface of each roller member.

In order to show clearly the difference between the radius R and $r$, this difference has been exaggerated in the drawings.

The embodiment illustrated in the drawings includes flanges 22 and 24 at the opposed ends of the two rotatable members 10 and 14 respectively. These flanges are provided with holes 26, whereby the two members may be separately joined to similar flanges provided on two shafts or similar rotatable parts (not shown) which are to be coupled by means of the coupling illustrated in the drawings.

Relative axial movement between these two shafts (not shown) is possible, since the barrel-shaped rollers 16 can rotate about their individual longitudinal axes, thereby allowing the two members 10 and 14 to slide freely relative to one another.

However, rotary displacement of the inner member 14 relative to the outer member 10 causes the barrel-shaped rollers 16 to tilt so as to frictionally engage the cylindrical surface of the bore 12, so that torque may be transmitted between the inner member 14 and the outer member 10. The maximum torque such as coupling can transmit depends to a large extent on the frictional characteristics of, and maximum stresses allowable within the materials used in the manufacture of the two members 10 and 14, and the rollers 16.

In the illustrated couplings the rollers are arranged in five rings each containing twelve rollers. However, a greater or lesser number of rings (including only one ring) and a greater or lesser number of rollers per ring may be employed according to the maximum value of the torque to which the coupling is to be subjected.

I claim:
1. A rotary coupling for transmitting torque between the two coaxial shafts while allowing relative axial movement therebetween comprising in combination an outer member having a smooth cylindrical bore, an inner member arranged coaxially within but radially spaced from the outer member, said inner member having a plurality of axially extending parallel concave grooves on its outer surface, a plurality of barrel-shaped rollers disposed in said grooves and retaining said members in spaced relationship, said rollers being tiltable to frictionally engage the two members to prevent relative rotary displacement therebetween but are freely rotatable about their axes to permit relative axial movement between the two members.

2. A rotary coupling according to claim 1 wherein said rollers are arranged in at least one ring which lies in a plane perpendicular to the axis of rotation of the coupling.

3. A rotary coupling for transmitting torque between two coaxial shafts while allowing relative axial movement therebetween comprising in combination a first member formed with a smooth cylindrical bore, a second generally cylindrical member of diameter less than that of the bore, said second member being formed with axially parallel longitudinal concave grooves each having a radius of curvature commensurate with the radius of the bore and a plurality of barrel-shaped roller members disposed in the grooves between the second member and the bore for radially supporting said second member coaxially within the bore, the maximum diameter of the circular cross-section of each roller being substantially equal to the maximum radial spacing between the bore and the grooves while the radius of curvature of the synclastic surface of each roller in an axial plane thereof is substantially equal to the radius of the bore, and the rollers are disposed in the grooves with the axis of symmetry of each roller in a plane which is perpendicular to the axis of the bore.

4. A rotary coupling according to claim 3 which further comprises a cage member disposed between said second member and said bore for axially locating the rollers.

5. A rotary coupling according to claim 4 wherein the rollers are arranged and located in rings and the axes of symmetry of the rollers in each ring all lie in the same plane.

References Cited

UNITED STATES PATENTS 2,293,085   8/1942   Stieber _____ 64—30

HALL C. COE, *Primary Examiner.*